Figure 4:
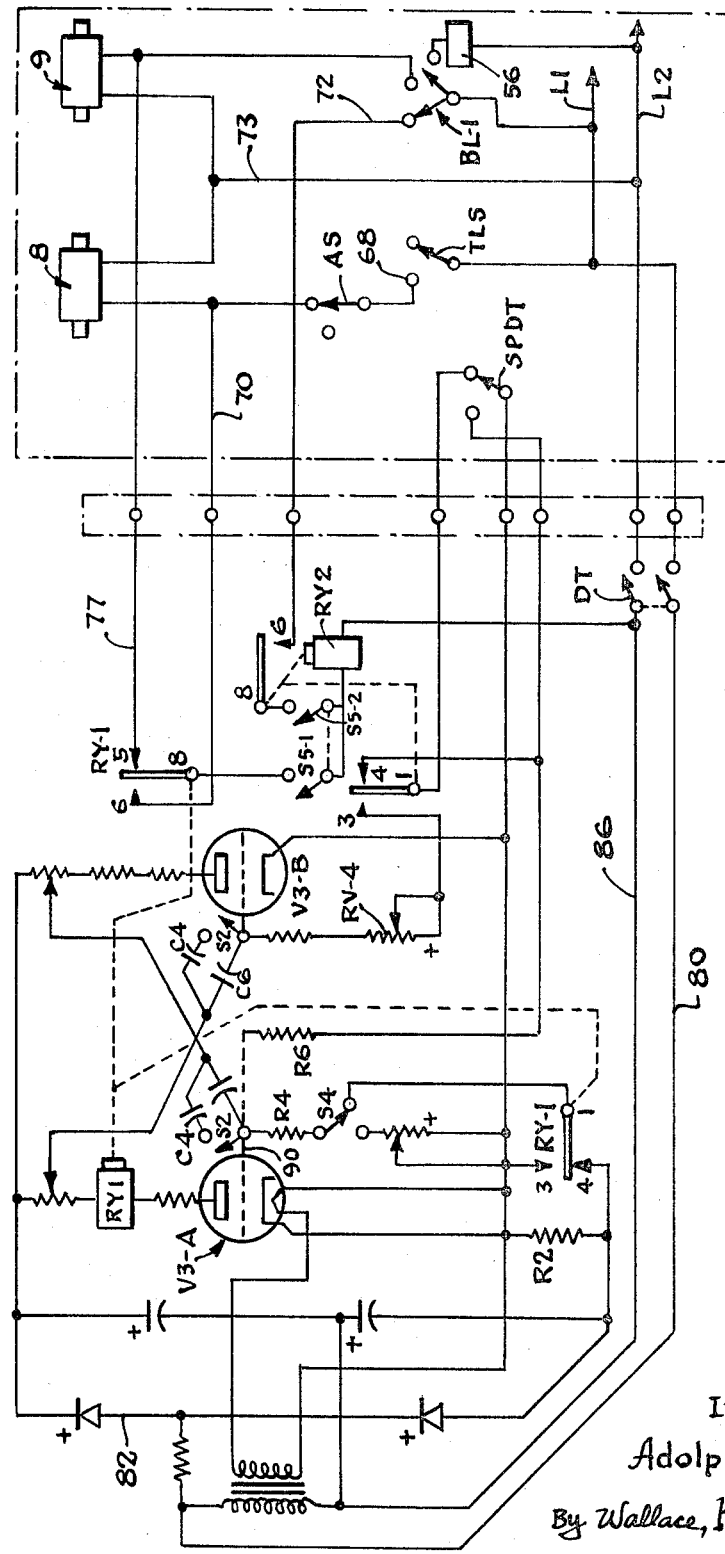

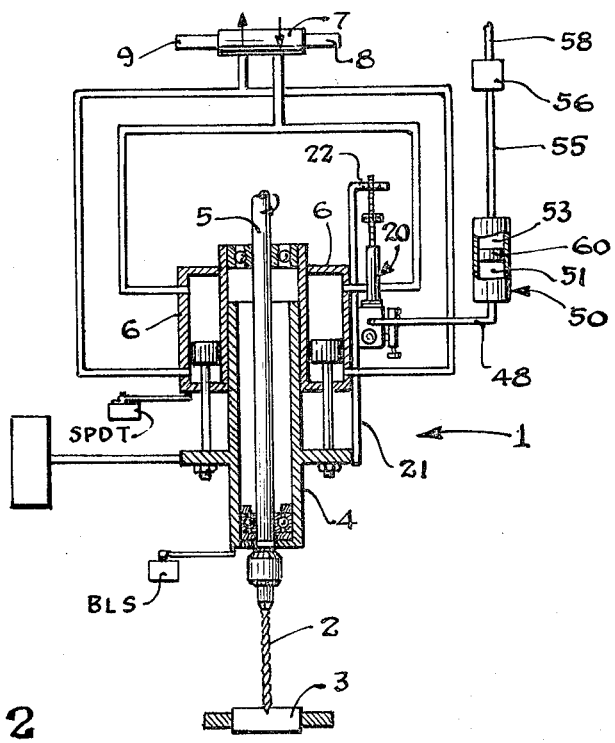
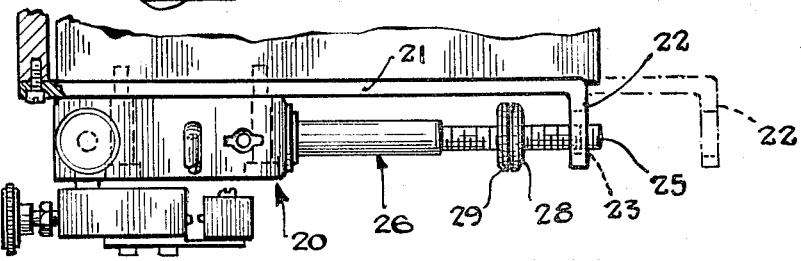
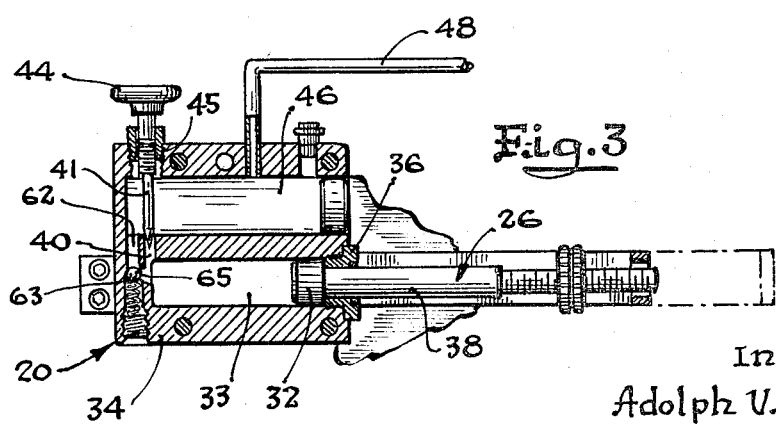

Nov. 22, 1966    A. V. KLANCNIK    3,286,555
STEP BY STEP FEED MEANS WITH A DASHPOT
Filed July 8, 1964    2 Sheets-Sheet 2

Inventor
Adolph V. Klancnik
By Wallace, Kinzer and Dorn
Attorneys

United States Patent Office 3,286,555
Patented Nov. 22, 1966

3,286,555
STEP BY STEP FEED MEANS WITH A DASHPOT
Adolph V. Klancnik, 1020 Glenview Road, Glenview, Ill.
Filed July 8, 1964, Ser. No. 380,996
2 Claims. (Cl. 77—32.3)

This invention relates to a control for automatic machine tools wherein a tool is mounted for reciprocating automatically toward and away from a workpiece incidental to tapping, broaching, reaming or other operations performed on the workpiece.

The present invention is particularly applicable to a form of machine tool having a drill or the like in which the rapidly rotating tool is mounted for movement on a spindle or the like for reciprocatory movement toward and from a workpiece. In certain drilling operations, it is necessary to break or remove the chips from the hole being drilled, and sometimes to cool the drill prior to the next drilling cut. Preferably, the tool would be reciprocated automatically in such an operation, and there would be successive or accumulative cuts with fast retraction of the drill after each of the successive cuts, thereby breaking and removing chips from the hole; the accomplishment of this in a novel and unique fashion constitutes the primary object of the present invention.

It is known to provide a dashpot for reducing the rate of movement of a drill or tool through a workpiece. An example of such an arrangement used to cushion the feed of the spindle during a drilling operation is disclosed in my United States Patent No. 2,986,957, and it is an object of the present invention that the arrangement disclosed in my aforesaid patent can be modified to achieve improved performance. Thus, an object of the present invention, in relation to machine tools wherein the tool is reciprocated alternately in the forward and the reverse directions during the machining of a workpiece, is to incorporate a dashpot mechanism so modified as to be effective to cushion the tool during each of the successive machining operations without affecting the operational speed during the reverse movement of the drill.

More specifically, and as a further object of the present invention, the dashpot is characterized as a fluid-operated device having a plunger which is adapted to be operated by a one-way connection with the reciprocatory machine tool only in the advancing direction and only at the latter part of each reciprocation in the advancing direction. Under this object of the invention, the reverse movement of the machine tool is unhampered by the dashpot, and the forward part of the advance of the machine tool is not resisted by the dashpot until reaching the position at which the dashpot was positioned during the last cutting operation. Accordingly, increased speed of operation is possible.

Another object of the present invention is to so control a machine tool as to provide cutting operations in an accumulative manner, wherein a dashpot is controlled for rapid return, at the end of a machining operation, to an original position under the control of a selectively operated fluid operable means.

Under the present invention, and as a further object thereof, the accumulative feed of the machine tool is controlled by a timing device operable to provide a constant period of time whereby the operation of the dashpot and the amount of cut for each successive operation is successively diminished as the tool proceeds further into the workpiece.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:
FIG. 1 is a schematic view of a reciprocatory machine tool equipped with the present invention;
FIG. 2 is a view of the dashpot and actuating means therefor;
FIG. 3 is a sectional view through the dashpot; and
FIG. 4 is a schematic electrical operating circuit for the machine tool of FIG. 1.

With particular reference now to the drawings and in the first instance to FIG. 1, there is generally designated at 1 a reciprocating machine tool which may be a drill, reamer, broaching tool or the like. The cutting tool 2 thereof is adapted to be advanced toward and away from a workpiece 3 by means of a so-called platen 4 having a spindle 5 rotatably mounted therein. Any suitable power means, not shown, may be provided to rotate the tool-carrying spindle.

Tools of this type are customarily provided with some power means for advancing the tool toward the workpiece and retracting it therefrom, and in the embodiment of the invention illustrated in the drawings this means is shown as a pair of fluid cylinders having the pistons thereof connected to the platen 4. Fluid, which may be air, is selectively admitted to one end or the other of the cylinder means 6 under control of a suitable 4-way valve 7. The valve may utilize a first solenoid 8 for shifting the valve spool to one limit position to admit fluid to the upper ends of the cylinders illustrated, thereby causing advance movement of the tool. A second solenoid 9 may, when energized, shift the valve spool in the opposite direction so as to admit fluid to the other end of the cylinders 6 for causing retracting movement of the tool 2.

Many machine tools are provided with some form of dashpot control device which controls movement of the tool at some pre-selected state of operation near the end of the performing stroke. For example, in my United States Patent No. 2,954,851, there is illustrated a dashpot including a cylinder and a plunger for restraining the tool during the time the drill or other tool is engaging the work piece and particularly just prior to the drill breaking through the far side of the piece. In the aforementioned United States patent, the machine operation was made in one continuous forward stroke of the tool, whereas in the preferred embodiment of the present invention a number of successive strokes are required to complete one machining operation.

In the present invention, and as important aspect thereof, the spindle 5 carrying the tool 2 is advanced, that is moved downwardly and encounters the resistance afforded by the dashpot 20 just prior to the first machining operation, and then during successive machining operations, the resistance of the dashpot 20 is encountered at the point of previous machining. That is to say, the platen 4 and spindle 5 are free of dashpot resistance while moving into and through the work piece to the point of last cutting, whereupon the resistance afforded by the dashpot 20 is again effective. In the present invention, during the retracting of upward movements of the spindle 5, the spindle 5 is free of resistance of the dashpot device.

For this purpose, there is provided a one-way connection between the dashpot 20 and the platen 4 for the spindle 5. The preferred form of one way connection includes a spider 21 secured to the platen 4 and adapted to reciprocate vertically with the platen 4 relative to the stationary hydraulic cylinders 6 and the frame of the machine tool 10 to which the dashpot 20 is attached.

The spider 21 has an offset arm 22 with an aperture 23 therein, which aperture is sufficiently large to move over the threaded end portion 25 of a plunger 26 for the dashpot 20. As best seen in FIG. 2, the spider 21 is free to move rightwardly without actuating the plunger 26 during a reverse or upward movement of the platen 4. However, on the down stroke (or leftward movement, FIG. 2) of the spider 21 the offset arm 22 moves the enlarged aperture 23 over the threaded end 25 of the plunger 26 into engagement with a first nut 28 threaded on the threaded end 25 of the plunger 26. A lock nut 29 is threaded on the threaded end 25 of the plunger 26 to lock the nut 28 in any one of an infinite number of variable positions.

By varying the position of the nut 28 on the plunger 26, the point of pickup of the dashpot plunger 26 can be varied so that initially the dashpot plunger 26 is picked up just prior to the tool engaging the workpiece 3. This point of pickup of the dashpot 20 mainly depends upon the size of the workpiece 3 being employed.

On the first downward stroke in a machining cycle for a workpiece 3, the nut 28 will have been positioned so that the offset arm 22 engages the nut 28 just prior to contact of the workpiece by the tool 2. This simulates the fast downward movement by an operator and then slower and softer contact with the workpiece during a manual operation.

As more fully explained in the aforesaid United States Patent No. 2,954,851, which is hereby incorporated by reference as if fully reproduced herein, the plunger 26 has a plunger head 32 disposed within a cylindrical bore 33 of a housing 34 for the dashpot 20. A plug 36 closes one end of the bore 33 and has an aperture therein through which slides the shank 38 of the piston 26. The bore 33 is filled with hydraulic fluid which is forced by the plunger head 32 through an opening 40 controlled by needle valve element 41.

The needle element 41 is adjusted by a knob 44 threaded in an insert 45, so that upon turning the knob 44 the amount of restriction to the flow of fluid through the passage 40 is adjusted. Fluid from the bore 33 flows through the passageway 40 and past the needle valve element 41 into a parallel bore or reservoir 46. Connected to the reservoir 46 is a fluid line 48 which is connected to a supply reservoir 50, FIG. 1 of hydraulic fluid. The supply reservoir 50 has a lower chamber 51 for receiving hydraulic fluid, and has an upper chamber 53 to receive a control fluid such as air admitted through an air line 55 controlled by a valve 56.

The function of the supply reservoir 50 is to rapidly return the plunger 26 after the last one of the successive machining cuts to its initial or upper position wherein the head 32 is disposed against the end of the plug 36, as seen in FIG. 3. More specifically, at the end of the control cycle, as to be explained hereinafter, the valve 56 is open to permit a high pressure air line 58 to supply air under high pressure to the chamber 53 of supply reservoir 50 to drive downwardly a piston 60 to force the hydraulic fluid in a chamber 51 beneath the piston 60 through the line 48.

The hydraulic pressure afforded from the high pressure line 48 is sufficient to drive the fluid in the bore 46 downwardly through a passageway 62 and through check valve 63 and an opening 65 into the bore 33 to drive the piston head 32 and plunger 26 in the return direction. Thus, the dashpot plunger 26 is adapted to be rapidly returned at the end of a machining operation for a given workpiece 3 in a manner independent of the spider 21 and platen 4.

The manner in which accumulative work performing strokes are employed under the present invention will become more apparent from the description of the operation of the machine in conjunction with FIG. 4.

The circuitry of FIG. 4 illustrates the control circuitry adapted to be used in a reciprocating mode wherein the drill readily moves downwardly in one machining operation until it is completed and then returns to the upper position. The same circuitry is illustrated in the accumulative mode wherein the tool 2 is reciprocated downwardly and upwardly over a number of cycles until the machine operation is completed, whereupon the tool is halted in its upper position until the next work piece is in position to be machined.

The circuitry shown in FIG. 4 includes a pair of tubes V3–A and V3–B which are adapted to be connected together to function basically as a conventional multivibrator with grid returns to the cathodes for the reciprocating mode, which will not be described hereinafter. For the reciprocating mode of operation, the multivibrator operation is unsymmetrical. In the accumulative mode, to be described hereinafter, the circuit functions basically as a single stage electronic timer furnishing a single timed output each time the circuit is activated. In the accumulative mode, the timing function of the circuit is provided by tube V3–B, as will be seen hereinafter.

The conversion of the conventional multivibrator circuit to this accumulative operation is accomplished by the addition of a resistor R–6, an SPDT switch, an external switch S–4, and an additional set of relay contacts RY–2–3 and 4. The external switch S–4 is shown in its accumulative position connecting the grid of tube V3–A to the common pole of contacts RY1–3 and 4. With switch S–4 closed, tube V3–A ceases to function as a time-controlled element, as a grid is now connected through a relatively low resistance discharge path through resistor R4 either directly to zero potential, to keep the tube V3–A conducting, or to highly negative bias developed across resistor R–2 to hold the tube V3–A cut-off. The relay contacts RY1–3 and RY1–4 determine whether the tube V3–A is connected to zero potential or to the highly negative bias developed across resistor R2.

It will be noted that relay RY–1 is in the plate circuit of the tube V3–A and when the tube V3–A is conducting the relay RY–1 will be energized to close contacts RY1–3, thereby placing the grid of tube V3–A at zero potential to keep the tube V3–A in its conducting state. Conversely, if the tube V3–A is de-energized, relay RY1 de-energizes and its contacts RY1–4 close to hold the grid of tube V3–A in this stable cut-off condition.

Initiation of the timed interval of operation of tube V3–A is affected by a closing of a reciprocatory top limit switch SPDT. Assuming tube V3–A to be cut off, the transfer of switch SPDT to close its normally open contact thereby connects the grid of tube V3–A through the switch SPDT to zero bias. The very low resistance of this connection (150 ohms through resistor R6) effectively short-circuits the negative bias provided through contacts RY1–4 causing the tube V3–A to conduct and pull in relay RY1. With transfer of contacts RY1, the tube V3–A is held at zero bias and in a conducting state.

As will be hereinafter explained in greater detail prior to the operation of tube V3–A, capacitor C6 (or capacitors C4 and C6) had been charged. Thus, when tube V3–A conducts, the grid of tube V3–B was driven to cut-off. However, as long as reciprocatory top limit switch SPDT is transferred to the normally open contact, capacitor C6 cannot discharge and no timing action takes place. When the reciprocatory top limit switch is returned to its normally closed contact, the discharge path is completed for capacitor C6 and capacitor C6 will discharge at a rate determined by a setting of resistance RV–4. When capacitor C6 discharges sufficiently, the grid of tube V3–B will cause conduction through its grid, thereby driving tube V3–A to cut off. This above operation is repeated each time the reciprocatory top limit switch SPDT is transferred as above.

When the platen 4 and spindle 5 are in their topmost positions, a top limit switch TLS will be moved by the spindle 5 from its normally open position into engagement with a contact 68, FIG. 4, to complete a circuit to incoming power source leads L1 and L2 and also to complete an energizing circuit to the down solenoid 8. However, the down solenoid 8 will not be energized to cause the downward movement of the spindle 5 until an actuating switch AS is operated. The switch AS can either be a manually operable switch or a time-controlled switch operable in time sequence after a magazine or the like has fed a work piece 3 into position beneath the tool 2.

Closure of the switch AS and operation of the down solenoid 8 forces fluid through the valve 7, FIG. 1, and through hydraulic lines into and against the top surfaces of the pistons to drive the platen 4 and spindle 5 downwardly. The top limit switch TLS is opened by the downward movement of the platen 4, but the down solenoid 8 is held operated under the control of a holding relay RY2. Holding relay RY2 was energized when the actuating switch AS was closed through a circuit extending from line L1, normally open now closed contacts of top limit switch TLS, now closed, actuating switch AS, lead 70, now closed, transfer contacts 8–6 of relay RY1, now closed contacts S5–1 and S5–2 of switch S5, the coil relay RY2, the now closed double throw switch DT to lead L2. The holding circuit for the down solenoid 8 is completed over the following path: from input lead L1, the normally closed, contact of bottom limit switch BL1, lead 72, now closed contacts 8–6 of relay RY–2, now closed contacts S5–2 and S5–1, now closed contacts 8–6 of relay RY1, lead 70, coil of solenoid 8, and return lead 73 to lead L2.

A short distance after the spindle 5 and platen 4 move in the advancing direction, a reciprocatory top limit switch SPDT is engaged by the platen 4 and is transferred from its normally closed position, FIG. 4, to its normally open, now closed position and thereby permits a capacitor C6 to discharge and to begin thereby a timing cycle controlling the time for downward movement of the spindle under the actuation of the down solenoid 8.

More specifically, with tube V3–A cut-off, the transfer of reciprocatory top limit switch SPDT to its normally open contact, the grid of tube V3–A is then connected through the switch to zero bias. The very low resistance of this connection effectively short circuits the negative bias provided through the transfer contacts 4–1 of relay RY–1. Thus, the tube V3–A conducts and pulls in relay RY–1. With relay RY–1 operated, it transfers contacts 1–4 to closing, and thereby holds the tube V3–A at zero bias in a conducting state.

While C6 is discharging, tube V3–A is conducting, and thereby completing a circuit for relay RY1, and it will be remembered, contacts 8–6 of relay RY1 complete the holding circuit for the down solenoid valve 8. When the capacitor C6 times out, tube V3–B begins conducting and drives the grid of the left hand section of tube V3–A to cut off which action de-energizes coil of relay RY1 and thereby opens the contacts 8–6 of relay RY1.

The opening of contacts 8–6 for relay RY1 breaks the aforementioned holding circuit for the down solenoid 8 and completes an energizing circuit for the up solenoid valve 9 causing the spindle 5 and platen 4 to begin to move upwardly. The energizing circuit for the up solenoid 9 is from lead L1, through normally closed contact BL1, lead 72, now closed contacts 8–6 of relay RY2, now closed contacts S5–2 and S5–1 of switch S5, normally closed transfer contacts 8–5 of relay RY1, lead 77, coil of the up solenoid 9, lead 73 to lead L2. With the de-energizing of solenoid RY1, its normally closed transfer contacts 1–4 connect the grid of tube V3–A to negative bias, thereby maintaining the grid at cut-off.

The spindle 5 continues to be retracted until reciprocatory top limit switch SPDT is contacted just prior to the top limit of upward movement. The contacting of switch SPDT causes it to move from its normally closed position to its normally open, now closed, position, to bring the grid of tube V3–A back to zero bias whereupon the tube V3–A again begins to conduct and complete the energizing path for relay RY1. Energization of relay RY1 transfers its contacts to complete an energization path for the down solenoid 8 through its now closed contacts 8–6 over a path including line L1, normally closed contacts BL1, lead 72, now closed contacts 8–6 of relay RY–2, closed contacts S5–2 and S5–1, now closed transfer contacts 8–6 of relay RY1, lead 70, coil of down solenoid 8, lead 73 to line L2.

Thus, a new stroke is automatically initiated wherein the spindle 5 and platen 4 move downwardly to bring the tool 2 into the work piece 3 to perform the next cutting operation. During the previous upward stroke of the spindle 5, the capacitor C6 is recharged and now begins to time out the downward movement of the spindle 5 for the second cutting operation. When the capacitor C6 times out, the tube V3–B begins conducting and drives the grid of tube V3–A to cut off to release relay RY–1 and cause energization of up solenoid 9. Thus, it will be seen that the spindle 6 moves downwardly for a mixed period of time as determined by variable resistance in discharge paths of the tubes.

The downward stroke is, in the preferred embodiment of the invention, for the same, fixed period of time for each of the successive machining strokes. A bottom limit switch BL1 referred to as BL1 elsewhere, is provided to be actuated when the tool has moved sufficiently downward to indicate the end of the machining operation, as for example drilling through the work piece 2. However, it will be realized that for each successive stroke slightly less machining is obtained because of the greater distance and time needed for the tool to travel to the previous point of cutting or machining. Thus, less time is afforded on each stroke for the resistance of the dashpot 20 to be effective during the latter part of downward movement of the spindle 5.

After these successive cutting operations and the reduced amount of cutting with each operation, the spindle 5 and platen 4 will actuate the bottom limit switch BSL to stop the cycles of reciprocatory movements for a given work piece and stop the spindle 5 at its upper position. More specifically, when the bottom limit switch BL1, FIG. 4, is actuated from its normally closed position to its normally open, now closed, position, the energizing circuit for solenoid 9 is completed from lead L1 through the coil of up solenoid 9, and lead 73 to lead L2. Also, it will be recalled that the energizing circuit for relay RY2 was through the normally closed contacts of bottom limit switch BL1, and hence this circuit is broken to release relay RY2. With transfer contacts 8–6 of relay RY2 open, the previously traced energizing circuits for the solenoids 8 and 9 are also broken so that relay RY1 cannot complete a circuit to the solenoids 8 or 9 so long as these transfer contacts 8–6 of the relay RY–1 remain open. De-energization of relay RY2 also causes its transfer contacts 1–3 to open and transfer contacts 1–4 to close, thereby connecting grid of tube V3–A to zero bias.

When the spindle 5 and platen 4 have moved upwardly, the bottom limit switch BL1 transfers back to its normally closed position and shortly before the spindle 5 reaches the top of the return stroke, the spindle and platen 4 cause the reciprocatory top limit switch SPDT to transfer to close its normally open contacts, which cause tube V3–A to again conduct and thereby complete the energizing circuit for relay RY1. However, the spindle will not reverse at this top point because the current for the down solenoid 8 has been cut off by the open contact 8–6 of relay RY2, and until the relay RY2 is operated, the spindle 6 will remain in this uppermost position. It will be recalled that relay RY2 was initially energized upon the closing of the actuating switch AS to begin a new accumulative machining cycle.

The closure of bottom limit switch BL1 also actuates solenoid controlled valve 56 for the dashpot 20, which valve remains open a sufficient period of time for high pressure air to enter chamber 53 and drive the piston 60 downwardly to force the hydraulic fluid in the chamber 60 through conduit 48 and into the bore 46 of the dashpot 20. The force of this hydraulic fluid forces fluid through the check valve 63 and into the chamber 33 to return the plunger 38 to its initial, upward position. The plunger 38 is returned to its initial position upon closure of switch BLS irrespective of the amount of time that the switch BLS is closed. That is, the solenoid valve 56 and its control function to return the plunger 38 irrespective of the time of opening the switch BLS. Hence, the spindle 5 remains at this top position until the actuating switch AS is again closed either by an operator or under some other control means.

From the foregoing, it will be seen that under the present invention the machine tool operations are possible wherein a dashpot resistance is picked up at the point of the previous machine cut to afford a slowdown in the movement of the spindle during the machine cut. Also, that the machine cut for each of the cuts of the operation is of a successively diminished amount.

The present invention does not limit the speed of reverse movement of the spindle nor the downward movement of the spindle until just prior to engagement with the workpiece. Finally, under the present invention quick return of the dashpot plunger 26 to its initial position occurs after the workpiece is machined, making possible improved operations.

Hence, while I have illustrated and described the preferred embodiment of my invention, it is to be understood that this is capable of variation and modification.

I claim:

1. In a reciprocatory machine tool, a spindle means reciprocatory towards and away from a workpiece, said spindle means adapted to receive a tool for performing machining operations on said workpiece when engaging said workpiece and when moving with said spindle in a first direction, power means for advancing and retracting said spindle means, a dashpot means having a plunger operable by said spindle means while said tool is in engagement with said workpiece to reduce the rate of movement of said spindle means in an advancing direction, a one way connecting means on said spindle means adapted to engage said plunger when said spindle means moves in said advancing direction, said one way connecting means being ineffective to move said plunger when said spindle moves in a retracting direction, electrical control means for said power means to cause reciprocation of said spindle means in a first direction toward said workpiece and to cause said power means to retract said spindle means, said electrical control means including timing means for operating said electrical control means to control said power means to move said spindle means in cyclic movements in said advancing direction and in said retracting direction to cause successive machining operations on said workpiece, first switch means in said electrical control means operable to disable said timing means to prevent said cyclic movements of said spindle means by said timing means and to enable said electrical control means to operate said power means to move said spindle means in the advancing direction, and second switch means in said electrical control means to detect movement of said spindle means to a predetermined position in said first direction to cause operation of said power means to retract said spindle means, and fluid actuated means controlled by said second switch means to return said plunger of said dashpot means to its original position when said spindle means has reached said predetermined position, said predetermined position corresponding to the completion of the machining operations on said workpiece.

2. In the machine tool of claim 1, wherein said timing means is a multivibrator, said first switch means causing unsymmetrical operation of said multivibrator.

References Cited by the Examiner

UNITED STATES PATENTS 2,852,965   9/1958   Wallace _____ 77—32.3

FRANCIS S. HUSAR, *Primary Examiner.*